April 1, 1958      R. P. MILES      2,829,236
WELDING APPARATUS
Filed May 3, 1956

*INVENTOR.*
RAY P. MILES
BY
*ATTORNEY*

United States Patent Office 2,829,236
Patented Apr. 1, 1958

2,829,236
WELDING APPARATUS
Ray P. Miles, Maple Heights, Ohio
Application May 3, 1956, Serial No. 582,414
3 Claims. (Cl. 219—74)

This invention relates generally to a welding apparatus and more particularly to a new and improved consumable electrode arc welder which is adapted for use in the welding of metals which tend to form an oxidized coating.

Various attempts have been made to use consumable electrode arc welders for the welding of metals such as aluminum and magnesium. In such devices it is necessary to supply the welding current through the electrode which is fed into a shield of inert gas. Since the electrode must be fed forward at all times during welding, it is necessary to provide a sliding electrical contact which connects the electrode to the source of electrical power. Because certain metals such as aluminum and magnesium form adherent oxide coatings which are poor conductors of electricity, there is a strong tendency for flash back to occur which prevents continuous uniform welding operations.

It is an important object of this invention to provide an apparatus for the consumable electrode flash welding of light metals which is capable of producing a uniform continuous weld.

It is another important object of this invention to provide a consumable electrode welding apparatus with means to insure that the electrode is clean so that a good electrical contact may be maintained therewith during the welding operation.

It is still another object of this invention to provide a consumable electrode arc welding apparatus having means for mechanically removing any foreign material or oxide coating which may be present on the electrode immediately prior to the welding operation.

It is still another object of this invention to provide a welding apparatus capable of performing continuous uniform welds on magnesium, aluminum or the like.

Further objects and advantages will appear from the following description and drawings, wherein.

Figure 1:
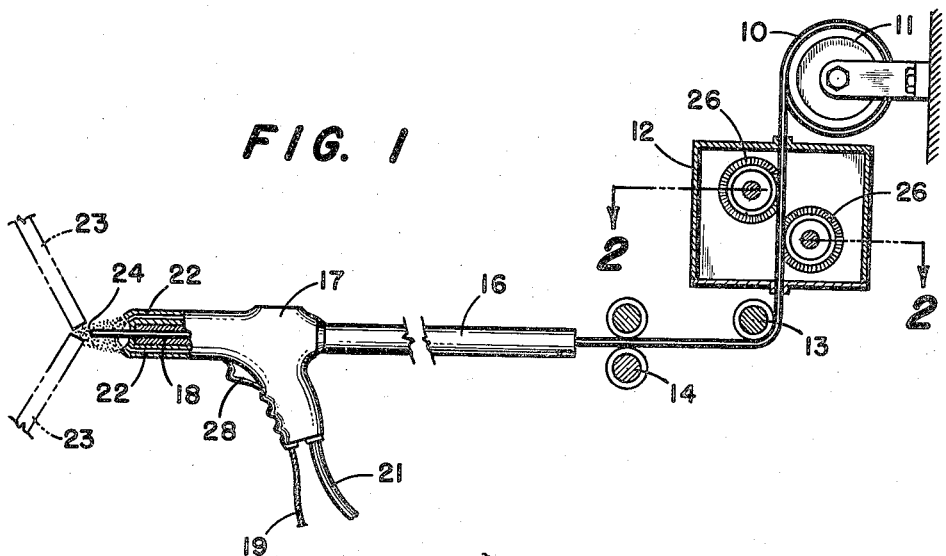
Figure 1 is a schematic illustration of the essential elements of the welding apparatus according to this invention.

Referring to the drawings, Figure 1 schematically discloses the various elements of a welder incorporating this invention. It should be understood, however, that the various proportions and positions of the elements can be changed to suit the design requirements of the particular installation.

A welding electrode 10, in the form of wire of the same material as the pieces to be welded, is dispensed from a reel 11. Motor driven feed rolls 14 pull the electrode 10 through a cleaning box 12, around suitable guide rolls 13 and push it through a flexible conduit 16 into a welding gun 17. A contact sleeve 18, through which the electrode 10 passes, located in the gun 17 is connected to a source of welding current (not shown) by an electrical conductor 19. As the electrode 10 passes through the sleeve 18, a sliding electrical contact is made which introduces the welding current to the electrode. An inert gas such as helium or argon is supplied to the welding gun 17 through a hose 21 which is in turn connected to passages 22 open at the head end of the gun 17 around the forward end of the electrode 10. The pieces to be welded 23 are connected to the source of electrical current in the conventional manner so that a complete circuit is provided to establish an electrical arc between the end 24 of the electrode 10 and the pieces to be welded 23.

In order to provide continuous uniform weld, it is imperative that a good electrical connection be provided between the electrode 10 and the sleeve 18. If this connection is momentarily lost, an arc is formed between the electrode 10 and the sleeve 18 which causes a burning of the electrode 10 within the sleeve 18 so that the sleeve and electrode weld together and prevent further welding. When such a failure occurs, it is necessary to cut off the end of the sleeve 18 and electrode 10 where they are welded together before the operation may be resumed. This is not only time consuming and expensive but results in an interrupted weld of inferior quality.

In order to prevent such failures and to insure that a good electrical contact is maintained between the electrode 10 and the sleeve 18, wire brushes 26 are located within the cleaning box 12 which are rotated by suitable motors 27. These brushes abrade the surface of the electrode 10 and mechanically remove any oxide coating or foreign matter which may be present thereon as it leaves the reel 11 so that a clean surface will be provided on the electrode as it passes through the sleeve 18. It is recognized that aluminum, magnesium and the like almost immediately form a new oxide coating. However, it has been found in actual practice that a thin oxide coating which may form on the electrode by the time a given portion thereof reaches the sleeve 18 will not cause difficulty and that failures are virtually eliminated when such a cleaning operation is utilized.

Figure 2:
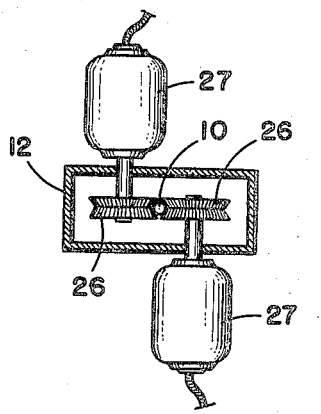
Figure 2 is a plan view taken along 2—2 of Figure 1.
Figure 3:
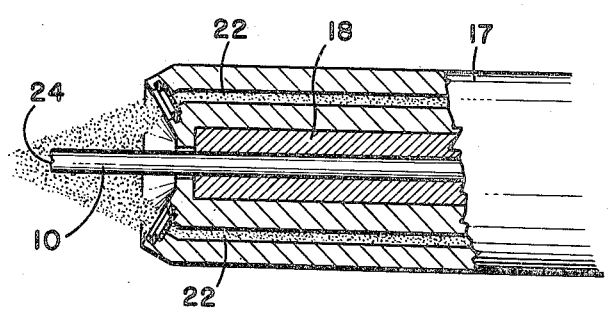
Figure 3 is an enlarged fragmentary longitudinal section of the head of the welding gun.

I prefer to provide two wire brushes 26 having notched profiles (see Figure 2) which engage opposite sides of the electrode 10 so that substantially all of the surface of the electrode will be cleaned. The wire brushes also provide a slightly rough surface on the electrode 10 which assists in maintaining a good electrical contact between the electrode and the sleeve 18. The cleaning box 12 collects the fine particles of foreign matter, oxide coating and any base metal which is removed. This is particularly important when the electrode is magnesium which is highly combustible in the finely divided state. By utilizing the disclosed structure it is possible to safely store the electrode for long periods of time before it is used since any oxide or other coatings which may form are automatically removed as the electrode is used. Again since the wire is clean there will be no impurities which might cause an inferior weld.

In the drawings the apparatus is shown as it would be used for semi-automatic welding. The apparatus is manually actuated by a trigger 28 which starts the feed rolls 14, provides the electrical connection for the arc and supplies the inert gas to shield the arc. Suitable controls known to those skilled in the art insure that the proper gas shield density and feed speed of the electrode will be provided. As the electrode 10 is melted away and deposited on the weld, the electrode is fed out the end of the gun. Because a welder according to this invention makes it possible to make a continuous uniform weld even with magnesium or aluminum it can be adapted to completely automatic welding by merely adding additional automatic controls known to those skilled in the art.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. The method of producing continuous uniform welds on magnesium by means of a shielded-arc consumable electrode process which comprises the steps of continuously passing a consumable magnesium electrode through a cleaning station, continuously substantially completely stripping all films and coatings from the electrode as it travels through the cleaning station to expose a substantially continuous surface of magnesium base metal, continuously feeding the thus cleaned electrode to a welding station and contacting the said electrode with a contact element of an electrical welding current source before there is formed on the electrode a coating of sufficient thickness ultimately to cause arcing between the electrode and the contact element and consequent welding of the electrode to the contact element, and continuously feeding the electrode into an electrical welding arc at a rate corresponding to the rate of consumption of the electrode.

2. The method of producing continuous uniform welds on aluminum by means of a shielded-arc consumable electrode process which comprises the steps of continuously passing a consumable aluminum electrode through a cleaning station, continuously substantially completely stripping all films and coatings from the electrode as it travels through the cleaning station to expose a substantially continuous surface of aluminum base metal, continuously feeding the thus cleaned electrode to a welding station and contacting the said electrode with a contact element of an electrical welding current source before there is formed on the electrode a coating of sufficient thickness ultimately to cause arcing between the electrode and the contact element and consequent welding of the electrode to the contact element, and continuously feeding the electrode into an electrical welding arc at a rate corresponding to the rate of consumption of the electrode.

3. A method of producing continuous uniform welds with an electrode of a metal which forms coatings that tend to cause arcing when engaged by an electrical current carrying contact in a shielded-arc consumable electro-process which comprises the steps of continuously passing a consumable electrode formed of said metal through a cleaning station, continuously substantially completely stripping all films and coatings from the electrode as it travels through the cleaning station to expose a substantially continuous uncoated surface on said electrode, continuously feeding the thus cleaned electrode to a welding station and contacting said electrode with a contact element of an electrical welding current source before there is formed on the electrode a coating of sufficient thickness to ultimately cause arcing between the electrode and the contact element and consequent welding of the electrode to the contact element, and continuously feeding the electrode into an electrically welding arc at a rate corresponding to the rate of consumption of the electrode.

References Cited in the file of this patent
UNITED STATES PATENTS

| | | |
|---|---|---|
| 2,606,267 | McElrath | Aug. 5, 1952 |
| 2,681,402 | Muller | June 15, 1954 |
| 2,694,763 | Muller | Nov. 16, 1954 |
| 2,727,125 | Muller | Dec. 13, 1955 |